United States Patent
Noguchi

(10) Patent No.: US 11,304,022 B2
(45) Date of Patent: Apr. 12, 2022

(54) VEHICLE WITH COMMUNICATION SYSTEM

(71) Applicant: HONDA MOTOR CO., LTD., Tokyo (JP)

(72) Inventor: Kohei Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/184,823

(22) Filed: Feb. 25, 2021

(65) Prior Publication Data
US 2021/0306789 A1    Sep. 30, 2021

(30) Foreign Application Priority Data

Mar. 31, 2020    (JP) .............................. JP2020-061879

(51) Int. Cl.
  *H04S 7/00*     (2006.01)
  *B62J 45/10*    (2020.01)
  *H04R 5/02*     (2006.01)

(52) U.S. Cl.
  CPC .............. *H04S 7/303* (2013.01); *B62J 45/10* (2020.02); *H04R 5/02* (2013.01); *H04R 2499/13* (2013.01); *H04S 2420/01* (2013.01)

(58) Field of Classification Search
  CPC ....... H04S 7/303; H04S 2420/01; H04R 5/02; H04R 2499/13; H04R 1/323; H04R 1/403; B62J 45/10
  See application file for complete search history.

(56) References Cited

U.S. PATENT DOCUMENTS

| | | | |
|---|---|---|---|
| 2017/0013385 A1* | 1/2017 | Vautin | H04S 7/30 |
| 2017/0317706 A1* | 11/2017 | Kudo | H04R 1/40 |
| 2020/0204966 A1* | 6/2020 | Thagadur Shivappa | H04W 4/023 |

FOREIGN PATENT DOCUMENTS

WO    2016/072164 A1    5/2016

OTHER PUBLICATIONS

Japanese Office Action with English translation dated Oct. 26, 2021, 5 pages.

* cited by examiner

*Primary Examiner* — Jason R Kurr
(74) *Attorney, Agent, or Firm* — Rankin, Hill & Clark LLP

(57) ABSTRACT

An own vehicle includes a wireless communication section, an application control section, and a speaker array. The application control section makes a voice call by wireless communication and the speaker array includes a plurality of speakers to output voice based on a voice signal in the voice call. The position information of the other calling party in the voice call is received by the wireless communication section and the relative speed as the moving speed of the other calling party with respect to the vehicle is calculated on the basis of the received position information. On the basis of the calculated relative speed, sound image localization processing is performed so that the sound image of the voice based on the voice signal to be output by the speaker array is in the direction in which the other calling party is positioned after the elapse of a prescribed time.

7 Claims, 7 Drawing Sheets

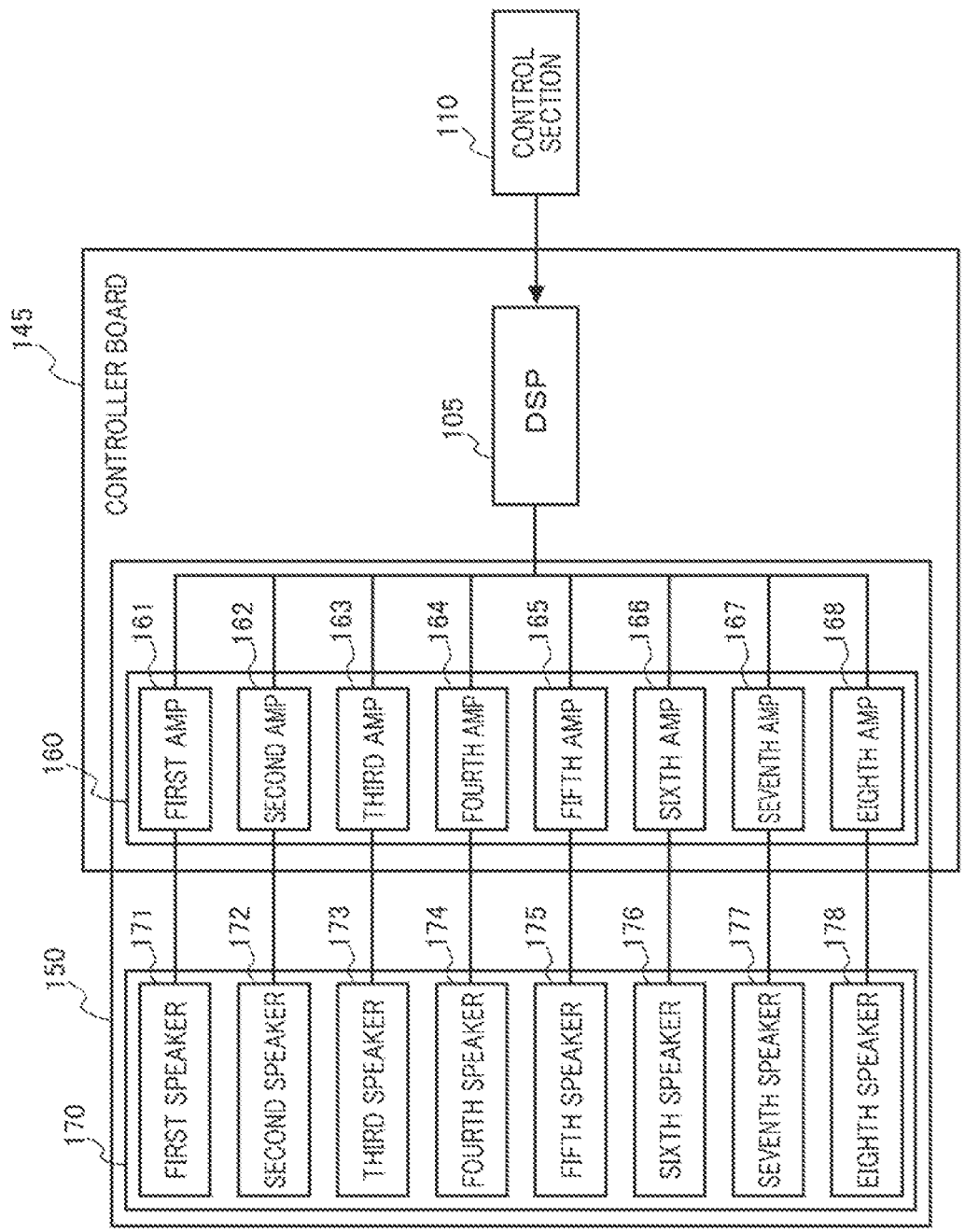

VEHICLE WITH COMMUNICATION SYSTEM

INCORPORATION BY REFERENCE

The present application claims priority under 35 U.S.C. § 119 to Japanese Patent Application No. 2020-061879 filed on Mar. 31, 2020. The content of the application is incorporated herein by reference in its entirety.

TECHNICAL FIELD

The present invention relates to a vehicle.

BACKGROUND ART

In the past, a technique which localizes voice output from a speaker in the direction of the sound source of the voice has been known.

For example, the car onboard speech processing device disclosed in Patent Literature 1 receives the position of another vehicle as transmitted from the other vehicle, the voice of a speaker in the other vehicle, and the direction of utterance of the speaker in the other vehicle and calculates the sound volume at which the voice is output, on the basis of the position of the own vehicle and the position of the other vehicle, and the direction of utterance of the speaker in the other vehicle. The car onboard speech processing device processes the speech in a sound field formed by a speaker array including a plurality of speakers so that the virtual sound source of the voice is formed in the direction of the position of the other vehicle, and outputs the voice using the speaker array at the sound volume.

CITATION LIST

Patent Literature

[Patent Literature 1] WO 2016/072164

SUMMARY OF INVENTION

Technical Problem

When hands-free calling is made during driving of a vehicle, it is desirable to minimize the possibility that the rider turns the eyes away from the traveling direction. The information which is provided to the rider by the sound image of voice based on a voice signal does not change the direction of the line of sight of the rider, so it can improve safety and the user-friendliness. Therefore, the demand exists to broaden the range of information provided to the rider by the sound image of voice based on a voice signal.

The present invention has been achieved in view of the abovementioned circumstances, and it is an object thereof to provide a vehicle which improves the user-friendliness for a rider by the sound image of voice based on a voice signal.

Solution to Problem

In order to achieve the object, according to a first feature of the present invention, there is provided a vehicle which includes a wireless communication section (101), a voice calling section (131), and a speaker array (170), in which the voice calling section (131) makes a voice call by wireless communication and the speaker array (170) includes a plurality of speakers (171 to 178) to output voice based on a voice signal in the voice call. In the vehicle (1A), position information of the other calling party in the voice call is received by the wireless communication section (101) and a relative speed as moving speed of the other calling party with respect to the vehicle (1A) is calculated on the basis of the received position information, and on the basis of the calculated relative speed, sound image localization processing is performed to make the sound image of the voice based on the voice signal to be output by the speaker array (170) be in a direction in which the other calling party is positioned after the elapse of a prescribed time.

According to a second feature of the present invention, in addition to the first feature, as the sound image localization processing, the vehicle (1A) may change the sound volume of the voice output from the speaker array (170), according to a distance to the other calling party.

According to a third feature of the present invention, in addition to the first feature, as the sound image localization processing, the vehicle (1A) may change the sound volume of the voice output from the speaker array (170) according to a distance between the other calling party and the vehicle (1A) after the elapse of the prescribed time.

According to a fourth feature of the present invention, in addition to any one of the first to third features, if the relative speed becomes large, the vehicle (1A) may change a localized position of the sound image of the voice toward a direction of moving away from the vehicle (1A).

According to a fifth feature of the present invention, in addition to any one of the first to fourth features, if the relative speed becomes small, the vehicle (1A) may change a localized position of the sound image of the voice toward a direction of moving close to the vehicle (1A).

According to a sixth feature of the present invention, in addition to any one of the first to fifth features, the vehicle (1A) comprises a manipulation portion (40) and a voice input section (140). When the manipulation portion receives manipulation, the voice signal based on the voice received by the voice input section (140) may be sent to the other calling party. As the manipulation portion (40) receives the manipulation, the speaker array (170) may be made to output a preset notification sound, and sound image localization processing may be performed to make the sound image of the notification sound be in a direction in which the other calling party is positioned after the elapse of the prescribed time.

According to a seventh feature of the present invention, in addition to any one of the first to sixth features, the position information which the wireless communication section (101) receives may be position information calculated on the basis of a positioning signal received from a positioning satellite.

Advantageous Effects of Invention

With the first feature, the vehicle includes the wireless communication section, voice calling section, and speaker array, in which the voice calling section makes a voice call by wireless communication and the speaker array includes a plurality of speakers to output voice based on the voice signal in the voice call. The position information of the other calling party in the voice call is received by the wireless communication section and the relative speed as the moving speed of the other calling party with respect to the vehicle is calculated on the basis of the received position information. On the basis of the calculated relative speed, sound image localization processing is performed to make the sound image of the voice based on the voice signal to be output by the speaker array be in the direction in which the other calling party is positioned after the elapse of the prescribed time.

Therefore, the direction in which the other calling party is positioned after the elapse of the prescribed time can be indicated by the sound image of the voice output by the speaker array. Consequently, the user-friendliness for the rider of the vehicle can be improved by the sound image of the voice based on the voice signal.

With the second feature, the vehicle changes the sound volume of the voice output from the speaker array according to the distance to the other calling party.

Therefore, the rider of the vehicle can perceive the distance to the other calling party by the sound volume of the voice output from the speaker array.

With the third feature, as the sound image localization processing, the vehicle changes the sound volume of the voice output from the speaker array according to the distance between the other calling party and the vehicle after the elapse of the prescribed time.

Therefore, the rider of the vehicle can perceive the distance to the other calling party after the elapse of the prescribed time by the sound volume of the voice output from the speaker array.

With the fourth feature, if the relative speed becomes large, the vehicle changes the localized position of the sound image of the voice toward the direction of moving away from the vehicle.

Therefore, the rider of the vehicle can perceive that the distance to the other calling party is becoming longer.

With the fifth feature, if the relative speed becomes small, the vehicle changes the localized position of the sound image of the voice toward the direction of moving close to the vehicle.

Therefore, the rider of the vehicle can perceive that the distance to the other calling party is becoming shorter.

With the sixth feature, the vehicle includes a manipulation portion and a voice input section. When the manipulation portion receives manipulation, the voice signal based on the voice received by the voice input section is sent to the other calling party. As the manipulation portion receives the manipulation, the speaker array is made to output the preset notification sound, and sound image localization processing is performed to make the sound image of the notification sound be in the direction in which the other calling party is positioned after the elapse of the prescribed time.

Therefore, the direction in which the other calling party is positioned can be indicated by the sound image of the notification sound, the notification sound being output when the manipulation portion receives manipulation. Consequently, the user-friendliness for the rider of the vehicle can be improved by the sound image of the notification sound.

With the seventh feature, the position information which the wireless communication section receives is position information calculated on the basis of a positioning signal received from a positioning satellite.

Therefore, high precision position information can be obtained.

BRIEF DESCRIPTION OF DRAWINGS

FIG. 5 is a diagram which shows the configuration of the voice output system mounted on the own vehicle.

DESCRIPTION OF EMBODIMENTS

Hereinafter, Embodiment of the present invention will be described referring to drawings. In the description below, direction-related words such as front, back, left, right, and up and down are the same as those with respect to the vehicle body unless otherwise specified. In each drawing, sign FR represents forward of the vehicle body, sign UP represents upward of the vehicle body, sign LH represents left of the vehicle body, and sign RH represents right of the vehicle body.

Figure 1:
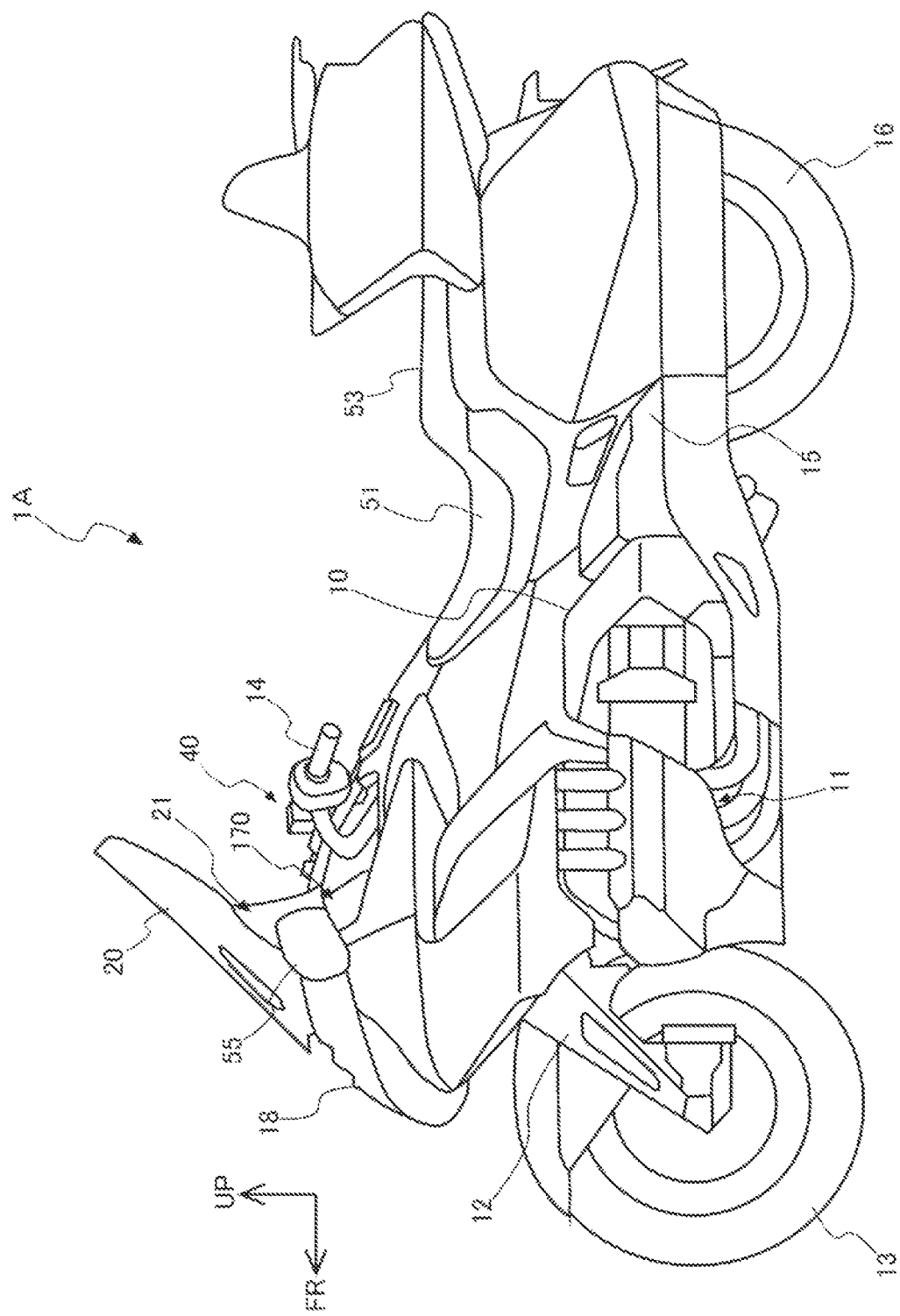
FIG. 1 is a side view of a motorcycle.
Figure 2:
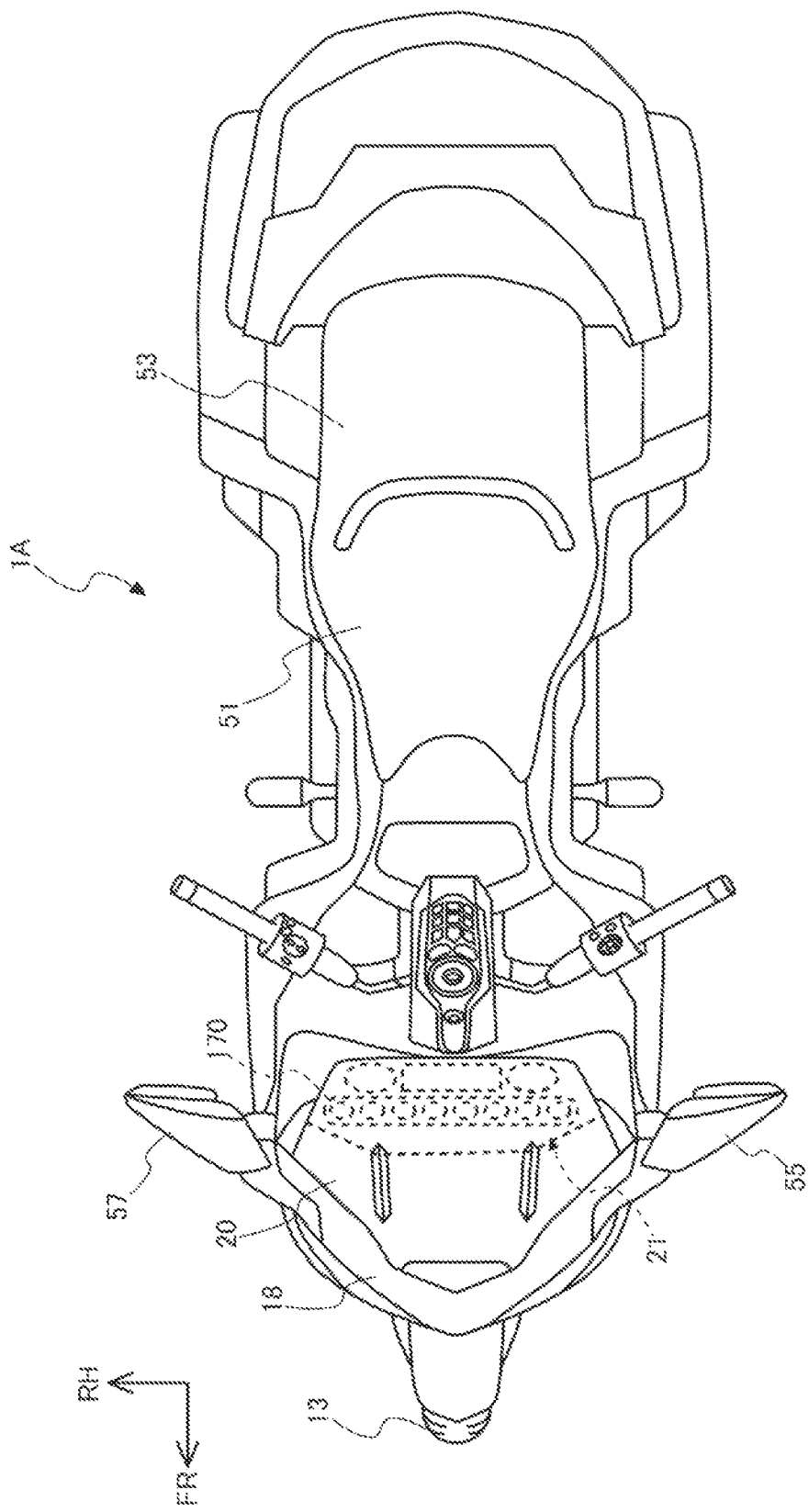
FIG. 2 is a top view of the motorcycle.
Figure 3:
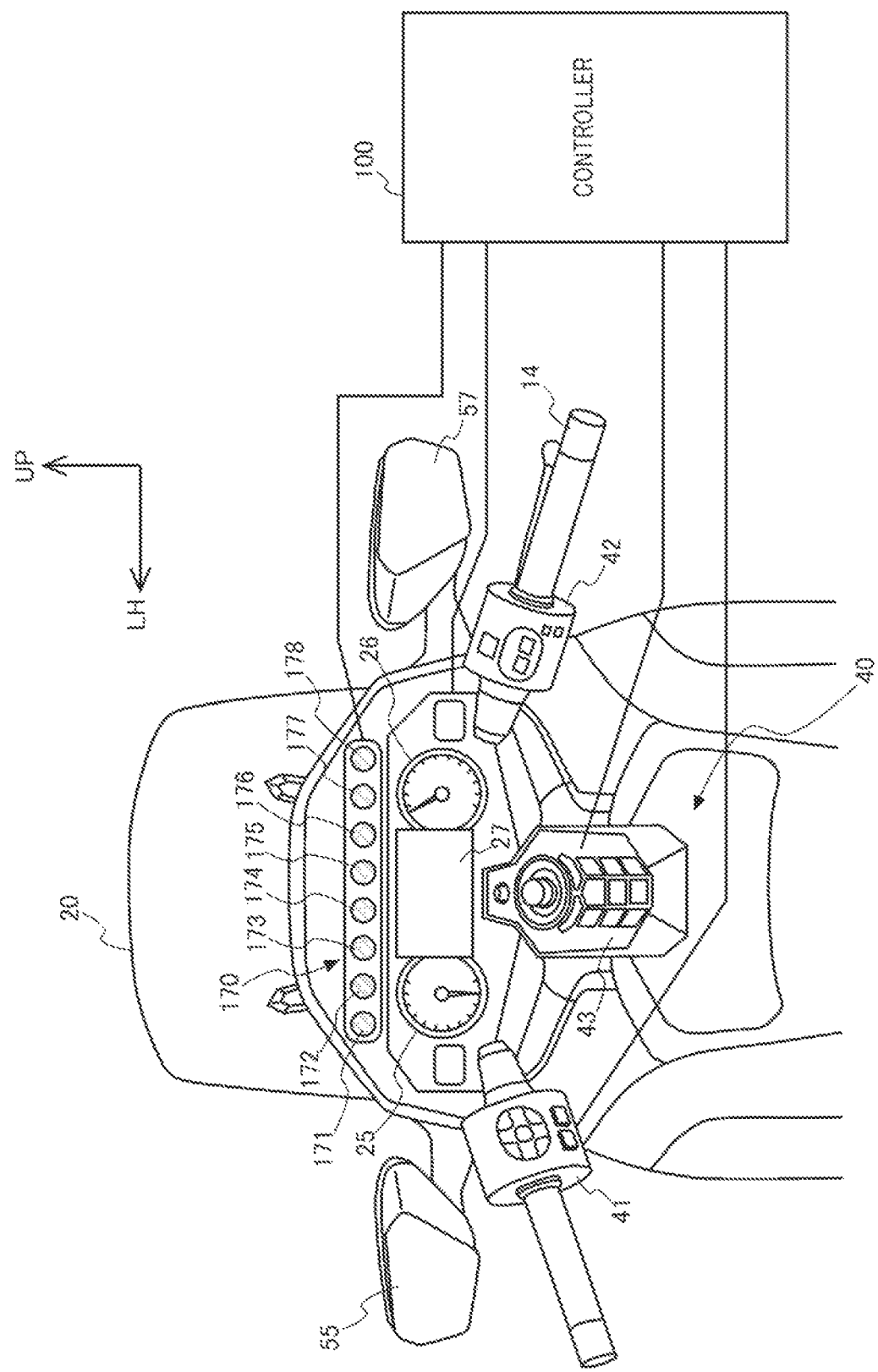
FIG. 3 is a view of the motorcycle as viewed forward from the rear.

FIG. 1 is a side view of a motorcycle according to an embodiment of the present invention; FIG. 2 is a top view of the motorcycle; and FIG. 3 is a view of the motorcycle as viewed forward from the rear. Hereinafter, a motorcycle on which the after-mentioned controller 100 is mounted is referred to as the own vehicle 1A. FIG. 1 to FIG. 3 show a case that the own vehicle 1A is a motorcycle, but the own vehicle 1A is not limited to a motorcycle.

As shown in FIG. 1, the own vehicle 1A includes a body frame 10 and a power unit 11 which is supported by the body frame 10. In the front portion of the body frame 10, a front wheel 13 is transversely steerably supported through a front fork 12 which also functions as a front cushion, and a steering handlebar 14 is provided at the top of the front fork 12. In the rear lower portion of the body frame 10, a rear wheel 16 is vertically swingably supported through a swing arm 15 and a pillion passenger seat 53 is interposed between the body frame 10 and the swing arm 15. The power unit 11 includes an engine and a transmission mechanism and rotatively drives the rear wheel 16 through a shaft drive mechanism.

As shown in FIG. 2, behind the steering handlebar 14, the body frame 10 supports a rider seat 51 for a rider to sit on and the pillion passenger seat 53 for a pillion passenger to sit on and also supports a body cover 18 covering almost the whole body frame 10. A front screen 20 or the like which covers an area in front of an occupant is attached to the body cover 18. A meter panel 21 and a speaker array 170 are arranged between the front screen 20 and the steering handlebar 14, in which the meter panel 21 shows various types of information and the speaker array 170 functions as a speaker unit. A manipulation portion 40 for menu selection or the like in the meter panel 21 is located around the steering handlebar 14. Also, a left mirror 55 and a right mirror 57 are located on the body cover 18. The left mirror 55 and right mirror 57 are located outside of the front screen 20 in the vehicle width direction of the own vehicle 1A.

A controller 100 which is electrically connected with the meter panel 21, speaker array 170, and manipulation portion 40 is mounted on the own vehicle 1A. The controller 100 controls the display content of the meter panel 21 and the output voice from the speaker array 170 and also receives various instructions from the rider through the manipulation portion 40.

FIG. 3 is a view which shows the area around the meter panel 21 as viewed from the rider, together with the controller 100. The meter panel 21 includes measuring instruments 25 and 26 and a display 27, in which the measuring instruments 25 and 26 show information related to the motorcycle (speed, engine speed, etc.) and the display 27 shows various types of information. The display 27 includes a known display panel such as a liquid crystal panel and displays various types of information for the rider or the like, under the control of the controller 100.

The speaker array 170 is located above the measuring instruments 25 and 26 of the meter panel 21 and the display 27. Since the speaker array 170 is located above the measuring instruments 25 and 26 of the meter panel 21 and the display 27, it is closer to the ears of the rider and can reduce the sound attenuation caused by the steering handlebar or the like.

The speaker array 170 is a speaker unit which includes a plurality of speakers arranged side by side in the width direction of the own vehicle 1A and broadens the audible area for the rider or the like in the widthwise direction. The structure is as follows: from left as viewed from the rider, a first speaker 171, a second speaker 172, a third speaker 173, a fourth speaker 174, a fifth speaker 175, a sixth speaker 176, a seventh speaker 177, and an eighth speaker 178 are arranged in a row. Due to this structure, even when the heads of the rider and pillion passenger move left or right or the like, the voice from any of the first speaker 171 to the eighth speaker 178 can be transmitted to the ears of the rider and pillion passenger. In this embodiment, an explanation is given of the case that the number of speakers in the speaker array 170 is eight, but the number of speakers is arbitrary and can be changed as appropriate.

In addition, in the own vehicle 1A, the manipulation portion 40 includes left and right handlebar manipulation portions 41 and 42 and a center manipulation portion 43. The manipulation portions 41 and 42 are located left and right on the steering handlebar 14 respectively and the center manipulation portion 43 is located between the speaker array 170 and a seat 17 and in the center position in the vehicle width direction. These manipulation portions 40 include not only a group of switches constituting a general manipulation system to manipulate a light device such as a blinker of the own vehicle 1A and turn ON/OFF the power unit 11, but also a group of switches constituting a manipulation system related to the display 27 of the meter panel 21 and the speaker array 170.

Figure 4:
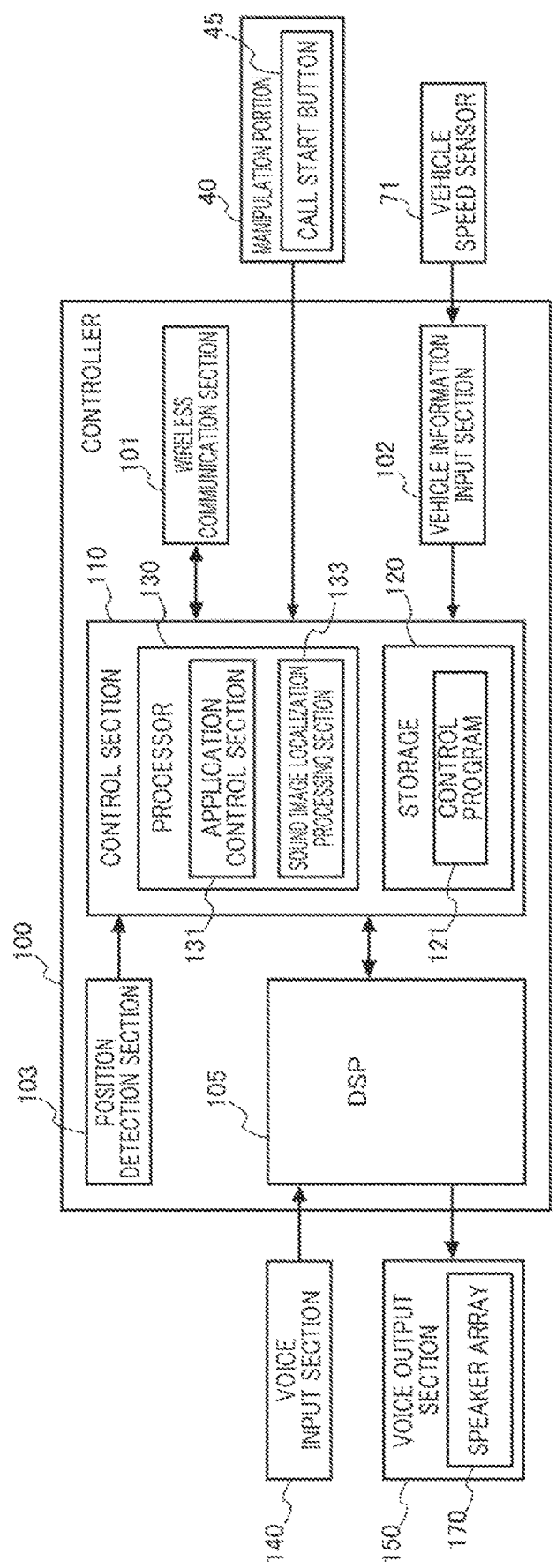
FIG. 4 is a block diagram which shows the configuration of the controller.

FIG. 4 is a block diagram which shows the configuration of the controller 100.

The configuration of the controller 100 is described below referring to FIG. 4.

The controller 100 includes a wireless communication section 101 (transmitter/receiver), a vehicle information input section 102 (circuit), a position detection section 103, a DSP 105, and a control section 110. DSP is an abbreviation for Digital Signal Processor.

The wireless communication section 101 makes wireless communications according to a prescribed communication protocol and connects to a mobile communication network. The wireless communication section 101 sends and receives communication data through the connected mobile communication network. The communication data includes voice data.

The vehicle information input section 102 functions as an interface for connection with the own vehicle 1A and receives vehicle information from the own vehicle 1A. The vehicle information includes sensor data of a vehicle speed sensor 71. The vehicle speed sensor 71 is a sensor which detects the vehicle speed of the own vehicle 1A. The vehicle speed sensor 71 detects the vehicle speed of the own vehicle 1A and outputs the sensor data indicating the detected vehicle speed, to the controller 100.

The position detection section 103 detects the current position of the own vehicle 1A. The position detection section 103 includes a GNSS receiver and a processor. The GNSS receiver receives a GNSS signal and the processor calculates the current position of the own vehicle 1A on the basis of the GNSS signal received by the GNSS receiver. The GNSS receiver and processor are omitted in the figure. The position detection section 103 outputs the position information indicating the calculated current position of the own vehicle 1A, to the control section 110. GNSS is an abbreviation for Global Navigation Satellite System.

The DSP 105 receives voice data which is included in the communication data received by the wireless communication section 101. The DSP 105 generates a voice signal on the basis of the received voice data. The generated voice signal is an analog signal and generated in a plurality of channels. The DSP 105 outputs the generated analog voice signal to a voice output section 150.

In addition, the DSP 105 is connected with a voice input section 140.

The voice input section 140 includes a microphone, and converts the voice of a user into an analog voice signal and outputs it to the DSP 105. The DSP 105 converts the voice signal received from the voice input section 140 into a digital signal and outputs it to the control section 110. The voice input section 140 collects the voice of the rider, for example, using an Incom attached to the rider or the microphone previously installed in the own vehicle 1A. For communications between the voice input section 140 and the controller 100, for example, short-range wireless communication such as Bluetooth is used. Bluetooth is a registered trademark.

Here, the configuration of a voice output system mounted on the own vehicle 1A is described referring to FIG. 5. FIG. 5 is a diagram which shows the configuration of the voice output system of the own vehicle 1A. The voice output system is mounted on a controller board 145. On the controller board 145, the DSP 105 and a signal amplifying section 160 are mounted. In addition, a power supply section which supplies battery electric power to the DSP 105 is mounted on the controller board 145. The power supply section is omitted in the figure.

The signal amplifying section 160 includes a first AMP 161, a second AMP 162, a third AMP 163, a fourth AMP 164, a fifth AMP 165, a sixth AMP 166, a seventh AMP 167, and an eighth AMP 168. AMP is an abbreviation for Amplifier.

The first AMP 161 is connected with the first speaker 171. The second AMP 162 is connected with the second speaker 172. The first AMP 161 amplifies the received voice signal and outputs it to the first speaker 171. The second AMP 162 amplifies the received voice signal and outputs it to the second speaker 172.

The third AMP 163 is connected with the third speaker 173. The fourth AMP 164 is connected with the fourth speaker 174. The fifth AMP 165 is connected with the fifth speaker 175. The sixth AMP 166 is connected with the sixth speaker 176.

The third AMP 163 amplifies the received voice signal and outputs it to the third speaker 173. The fourth AMP 164 amplifies the received voice signal and outputs it to the fourth speaker 174. The fifth AMP 165 amplifies the received voice signal and outputs it to the fifth speaker 175. The sixth AMP 166 amplifies the received voice signal and outputs it to the sixth speaker 176.

The seventh AMP 167 is connected with the seventh speaker 177. The eighth AMP 168 is connected with the eighth speaker 178. The seventh AMP 167 amplifies the received voice signal and outputs it to the seventh speaker 177. The eighth AMP 168 amplifies the received voice signal and outputs it to the eighth speaker 178.

Referring back to FIG. 4, the description of the configuration of the controller 100 is continued.

The control section 110 is a computer device which includes a storage 120 and a processor 130. The storage 120 includes memories such as a ROM and RAM. ROM is an abbreviation for Read Only Memory. RAM is an abbreviation for Random access memory. The storage 120 stores the control program 121 to be executed by the processor 130. The control program 12 includes an application program. The storage 120 also stores the data processed at the time of execution of a computer program by the processor 130, and the processing result data.

The processor 130 includes a CPU, a microcomputer, a DSP and so on and controls various parts of the control section 110 by executing a program. CPU is an abbreviation for Central Processing Unit. DSP is an abbreviation for Digital Signal Processor. The processor 130 may be an SoC which integrates the processor 130 and storage 120. SoC is an abbreviation for System-on-a-chip.

The control section 110 implements various functional elements by the processor 130 executing the control program 121 stored in the storage 120. The control section 110 in this embodiment includes, as functional elements, an application control section 131 and a sound image localization processing section 133.

Also, the control section 110 is connected with the wireless communication section 101, vehicle information input section 102, position detection section 103, DSP 105, and manipulation portion 40.

The application control section 131 is a function which is implemented by the processor 130 executing the application program stored in the storage 120. The application control section 131 controls transmission and reception of voice data through an IP network. The application control section 131 functions as a voice calling section. For example, the application control section 131 sends and receives packets into which encoded voice data is divided at regular time intervals, according to the VoIP standard through an IP network. IP is an abbreviation for Internet Protocol. VoIP is an abbreviation for Voice over Internet Protocol.

As the communication method of the wireless communication section 101, long-range communication Bluetooth or Wi-Fi Direct may be used. Wi-Fi is a registered trademark. In this case, the application control section 131 connects to the paired other device by controlling the wireless communication section 101. Alternatively, as the communication method of the wireless communication section 101, ZigBee may be used. ZigBee is a registered trademark. In this case, the application control section 131 can connect to a plurality of other calling parties simultaneously by controlling the wireless communication section 101.

In addition, the application control section 131 receives the position information of the own vehicle 1A which the position detection section 103 has detected. The application control section 131 sends the received position information of the own vehicle 1A to the controller 100 of the other calling party. The application control section 131 sends the position information of the own vehicle 1A to the other calling party through the IP network which is used to send and receive voice data.

The application control section 131 sequentially receives the position information which the wireless communication section 101 has received from the other calling party. The application control section 131 also sequentially receives the position information of the own vehicle 1A which the position detection section 103 has detected.

The application control section 131 calculates the moving speed of the own vehicle 1A from the change in the position information of the own vehicle 1A which it receives sequentially. Similarly, the application control section 131 calculates the moving speed of the other calling party from the change in the position information of the other calling party which it receives sequentially. Then, the application control section 131 determines whether or not the difference between the calculated moving speed of the own vehicle 1A and the calculated moving speed of the other calling party is within a prescribed range and determines whether or not the other calling party is riding on a vehicle.

If the application control section 131 determines that the other calling party is riding on a vehicle, it determines whether or not the distance between the own vehicle 1A and the vehicle on which the other calling party is riding is within a preset distance. Hereinafter, the vehicle on which the other calling party is riding is called the other vehicle 1B.

If the application control section 131 determines that the other calling party is riding on the other vehicle 1B and the distance between the other vehicle 1B and the own vehicle 1A is within the preset distance, it instructs the sound image localization processing section 133 to perform sound image localization processing.

The sound image localization processing section 133 controls the DSP 105 and the signal amplifying section 160 to perform sound image localization processing to fix the position of a sound image. A sound image is a virtual sound source and localization means to fix a position. In other words, it means to make the rider hearing the sound output from the speaker array 170 perceive as if a sound source exists at the position fixed by the sound image localization processing section 133. The sound image localization processing section 133 changes the localized position of the sound image by controlling the sound volume of the voice output by the first speaker 171 to the eighth speaker 178.

The sound image localization processing section 133 also sequentially receives the position information of the other vehicle 1B received through the wireless communication section 101 and sequentially receives the position information of the own vehicle 1A detected by the position detection section 103.

As the application control section 131 gives an instruction to perform sound image localization processing, the sound image localization processing section 133 performs sound image localization processing on the basis of the position information of the own vehicle 1A and the position information of the other vehicle 1B which are sequentially received.

First, the sound image localization processing section 133 calculates the moving speed of the other vehicle 1B on the basis of the sequentially received position information of the other vehicle 1B. Also, the sound image localization processing section 133 calculates the moving speed of the own vehicle 1A on the basis of the sequentially received position information of the own vehicle 1A. Alternatively, the sound image localization processing section 133 may calculate the moving speed of the own vehicle 1A on the basis of the sensor data sequentially received from the vehicle speed sensor 71.

Then, the sound image localization processing section 133 calculates the relative speed as the speed of the other vehicle 1B with respect to the own vehicle 1A, on the basis of the calculated moving speeds of the own vehicle 1A and the other vehicle 1B. After calculating the relative speed, the sound image localization processing section 133 calculates the distance between the own vehicle 1A and the other vehicle 1B after the elapse of a prescribed time, on the basis of the calculated relative speed. The prescribed time is a short time, for example, one to five seconds.

After calculating the relative speed of the other vehicle 1B with respect to the own vehicle 1A and the distance between the own vehicle 1A and the other vehicle 1B after the elapse of the prescribed time, the sound image localization processing section 133 determines the direction of localization of the sound image and the sound volume of the sound image on the basis of the calculated information.

Specifically, the sound image localization processing section 133 determines the sound volume of the sound image on the basis of the calculated distance between the own vehicle 1A and the other vehicle 1B after the elapse of the prescribed time. The sound image localization processing section 133 calculates the difference between the previous calculated distance between the own vehicle 1A and the other vehicle 1B after the elapse of the prescribed time and the current calculated distance between the own vehicle 1A and the other vehicle 1B after the elapse of the prescribed time. The sound image localization processing section 133 determines whether or not the distance between the own vehicle 1A and the other vehicle 1B is becoming shorter, on the basis of the calculated difference in the distance.

If the sound image localization processing section 133 determines that the distance between the own vehicle 1A and the other vehicle 1B is becoming shorter, it determines the sound volume of the sound image so that the sound volume is larger than at the previous time of determination. In addition, if the sound image localization processing section 133 determines that the distance between the own vehicle 1A and the other vehicle 1B is becoming longer, it determines the sound volume of the sound image so that the sound volume is smaller than at the previous time of determination.

In addition, the sound image localization processing section 133 determines the direction of localization of the sound image on the basis of the relative speed of the other vehicle 1B with respect to the own vehicle 1A.

If the relative speed of the other vehicle 1B with respect to the own vehicle 1A is a positive value, the sound image localization processing section 133 determines that the other vehicle 1B is moving away from the own vehicle 1A. In this case, the sound image localization processing section 133 changes the localized position of the call voice toward the direction of moving away from the own vehicle 1A. As for the direction toward which the position is changed, it is recommended that the moving direction of the other vehicle 1B be determined on the basis of the position of the other vehicle 1B as indicated by the previous received position information and the position of the other vehicle 1B as indicated by the current received position information, and the localized position of the call voice be changed toward the determined moving direction.

If the relative speed of the other vehicle 1B with respect to the own vehicle 1A is a negative value, the sound image localization processing section 133 determines that the other vehicle 1B is moving close to the own vehicle 1A. In this case, the sound image localization processing section 133 changes the localized position of the call voice toward the direction of moving close to the own vehicle 1A. The direction toward which the position is changed is the same as when the relative speed of the other vehicle 1B with respect to the own vehicle 1A is a positive value.

If the relative speed is almost zero, the sound image localization processing section 133 does not change the localized position of the sound image and also does not change the sound volume. After determining the sound volume of the sound image and the direction of localization of the call voice, the sound image localization processing section 133 controls the signal amplifying section 160 and DSP 105 so that the sound volume and the direction of localization become as determined.

Figure 6A:
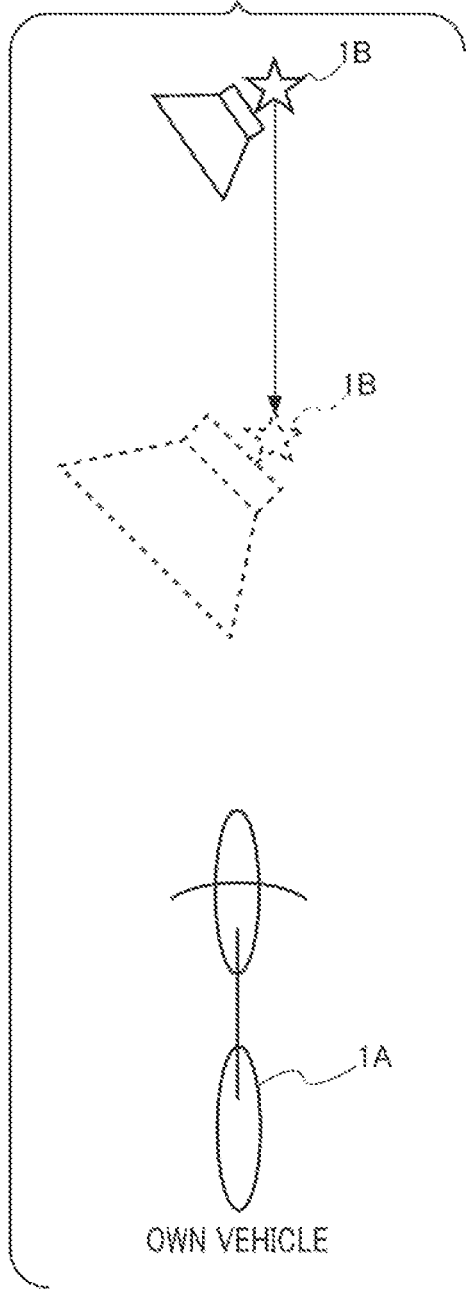
FIG. 6A and FIG. 6B are diagrams which show the relation among the distance between the own vehicle and the other vehicle, the localized position of a sound image, and sound volume.
Figure 6B:
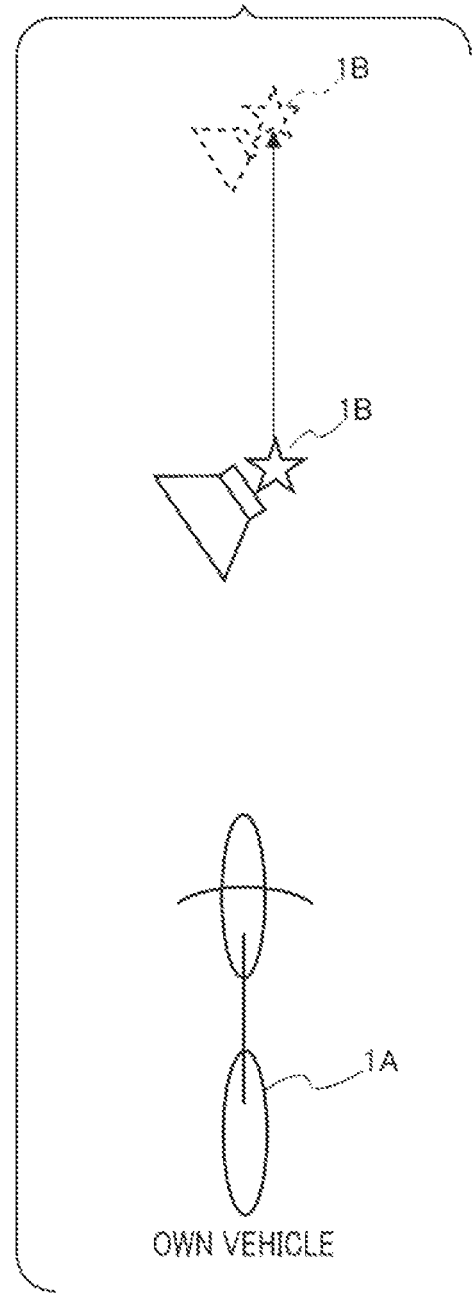

FIG. 6A and FIG. 6B are diagrams which show the relation among the distance between the own vehicle 1A and the other vehicle 1B, the localized position of the sound image, and sound volume.

In FIG. 6A and FIG. 6B, the star-shaped graphic indicated by solid line represents the current position of the other vehicle 1B. In FIG. 6A and FIG. 6B, the star-shaped graphic indicated by dotted line represents the position of the other vehicle 1B after the elapse of a prescribed time. In FIG. 6A and FIG. 6B, the speaker icon indicated by solid line represents the localized position of the sound image and the sound volume which have been determined previously. In FIG. 6A and FIG. 6B, the speaker icon indicated by dotted line represents the localized position of the sound image and the sound volume which are determined currently. The speaker icons show that when they are larger in size, the sound volume of the sound image is larger and when they are smaller in size, the sound volume of the sound image is smaller.

FIG. 6A shows the case that the relative speed of the other vehicle 1B with respect to the own vehicle 1A is a negative value and the other vehicle 1B is moving close to the own vehicle 1A. FIG. 6B shows the case that the relative speed of the other vehicle 1B with respect to the own vehicle 1A is a positive value and the other vehicle 1B is moving away from the own vehicle 1A.

If as shown in FIG. 6A the sound image localization processing section 133 determines that the relative speed of the other vehicle 1B with respect to the own vehicle 1A is a negative value and after the elapse of the prescribed time, the other vehicle 1B is moving close to the own vehicle 1A, it changes the localized position of the sound image to a nearer position to the own vehicle 1A than the previously determined localized position of the sound image, and sets the sound volume of the sound image to a larger volume than the previously determined sound volume as shown in FIG. 6A.

If as shown in FIG. 6B the sound image localization processing section 133 determines that the relative speed of the other vehicle 1B with respect to the own vehicle 1A is a positive value and after the elapse of the prescribed time, the other vehicle 1B is moving away from the own vehicle 1A, it changes the localized position of the sound image toward the direction of moving away from the own vehicle 1A further than the previously determined localized position of the sound image, and sets the sound volume of the sound image to a smaller volume than the previously determined sound volume as shown in FIG. 6B.

In addition, the sound image localization processing section 133 may calculate the distance between the own vehicle 1A and the other vehicle 1B on the basis of the position information received from the other vehicle 1B and the position information detected by the position detection section 103, and determine the sound volume of the sound image on the basis of the calculated distance.

In addition, the method of calling between the controller 100 mounted on the own vehicle 1A and the controller 100 mounted on the other vehicle 1B may be a half-duplex communication calling method. For example, when a call start button 45 provided on the manipulation portion 40 is pressed, the controller 100 sends the voice data received by the voice input section 140 to the controller 100 of the other vehicle 1B. Furthermore, when the call start button 45 is pressed, the controller 100 of the own vehicle 1A causes the speaker array 170 to output a preset notification sound. At this time, the controller 100 of the own vehicle 1A changes the direction of localization of the notification sound and the direction of the sound image in the same way as those for the voice of the other calling party.

In other words, the controller 100 determines the sound volume of the sound image of the notification sound on the basis of the distance between the own vehicle 1A and the other vehicle 1B after the elapse of the prescribed time. Also, the controller 100 determines the direction of localization of the sound image of the notification sound on the basis of the relative speed of the other vehicle 1B with respect to the own vehicle 1A. If the value of the relative speed is positive, the sound image localization processing section 133 changes the localized position of the notification sound toward the direction of moving away from the own vehicle 1A. If the value of the relative speed is negative, the sound image localization processing section 133 changes the localized position of the notification sound toward the direction of moving close to the own vehicle 1A. After determining the sound volume of the sound image of the notification sound and the direction of localization of the notification sound, the sound image localization processing section 133 controls the signal amplifying section 160 and DSP 105 so that the sound volume and the direction of localization become as determined.

Figure 7:
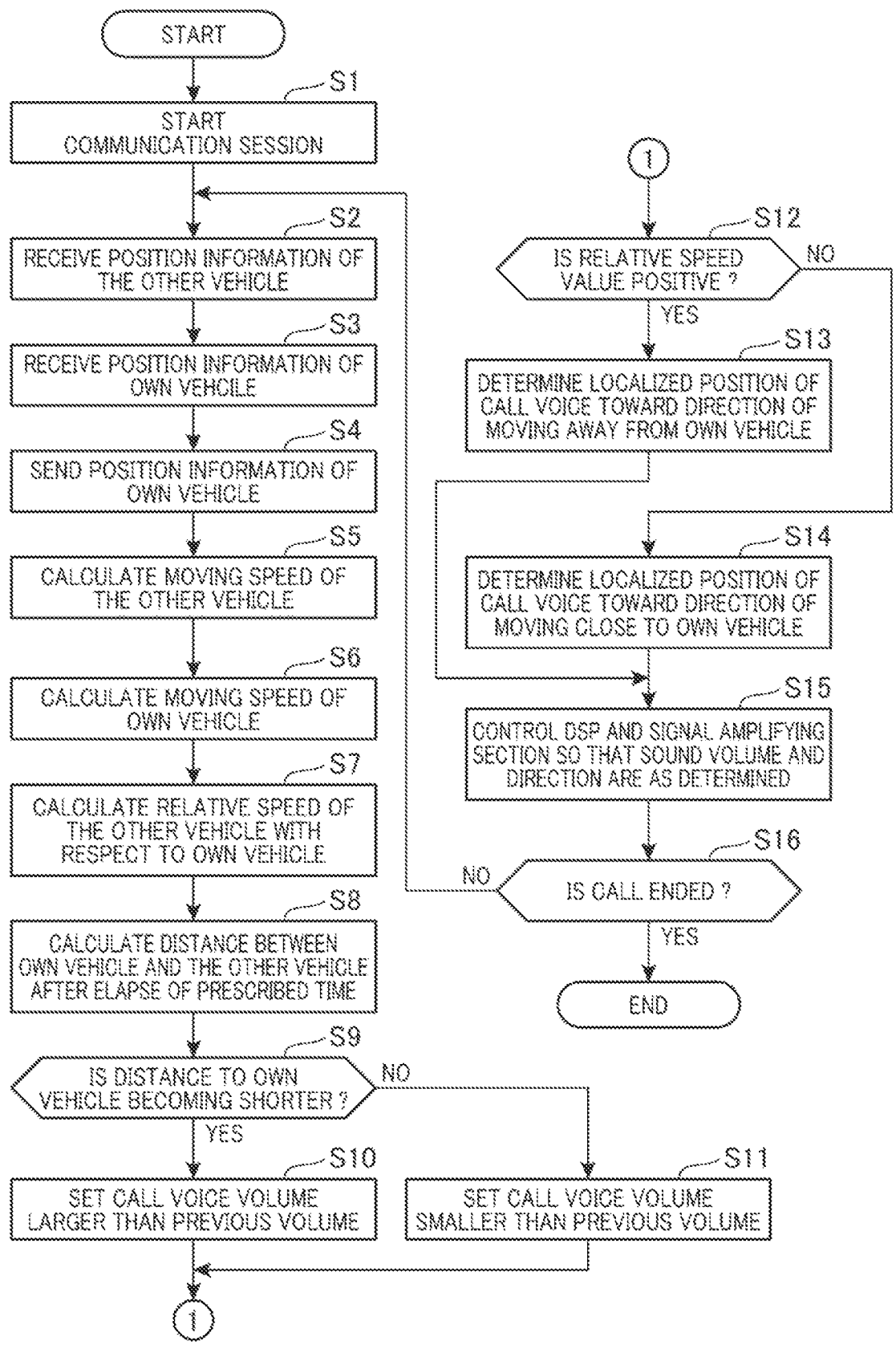
FIG. 7 is a flowchart which shows operation of the controller.

FIG. 7 is a flowchart which shows operation of the control section 110.

The operation of the control section 110 is described below referring to FIG. 7.

As the manipulation portion 40 receives manipulation to select the other calling party, the control section 110 sends an outgoing message including the phone number of the other calling party selected by this manipulation through the wireless communication section 101. When the wireless communication section 101 receives a reply message sent from the other calling party, a communication session is started.

In addition, as the wireless communication section 101 receives the outgoing message including the phone number of the other calling party, the control section 110 causes the speaker array 170 to output a prescribed ring tone. When a specific button of the manipulation portion 40 is manipulated, the control section 110 sends a reply message to the controller 100 of the other vehicle 1B as the other calling party. A communication session is thus started.

As the communication session is started (Step S1), the control section 110 receives the position information sent from the controller 100 of the other vehicle 1B (Step S2). The control section 110 also receives the position information of the own vehicle 1A detected by the position detection section 103 (Step S3). The control section 110 sends the received position information of the own vehicle 1A to the controller 100 of the other vehicle 1B (Step S4).

Then, the control section 110 calculates the moving speed of the other vehicle 1B on the basis of the position information which the wireless communication section 101 has received from the controller 100 of the other vehicle 1B (Step S5). The control section 110 calculates the moving speed of the other vehicle 1B on the basis of the position information which the wireless communication section 101 sequentially receives from the controller 100 of the other vehicle 1B (Step S5). The control section 110 also calculates the moving speed of the own vehicle 1A on the basis of the position information received from the position detection section 103. The control section 110 calculates the moving speed of the own vehicle 1A on the basis of the position information which it sequentially receives from the position detection section 103 (Step S6).

Then, the control section 110 calculates the relative speed as the speed of the other vehicle 1B with respect to the own vehicle 1A, on the basis of the moving speed of the other vehicle 1B calculated at Step S5 and the moving speed of the own vehicle 1A calculated at Step S6 (Step S7).

Then, the control section 110 calculates the distance between the own vehicle 1A and the other vehicle 1B after the elapse of the prescribed time, on the basis of the relative speed calculated at Step S7 and the position information of the other vehicle 1B received at Step S2 (Step S8).

Then, the control section 110 determines the sound volume of the call voice to be output by the speaker array 170 and the position in which the call voice is localized.

First, the control section 110 calculates the difference between the previous calculated distance between the own vehicle 1A and the other vehicle 1B after the elapse of the prescribed time and the current calculated distance between the own vehicle 1A and the other vehicle 1B after the elapse of the prescribed time. The control section 110 determines whether or not the distance between the own vehicle 1A and the other vehicle 1B is becoming shorter, on the basis of the calculated difference in the distance (Step S9).

If the control section 110 determines that the distance between the own vehicle 1A and the other vehicle 1B is becoming shorter (Step S9/YES), it determines the sound volume of the sound image so that the sound volume is larger than at the previous time of determination (Step S10). If the control section 110 determines that the distance between the own vehicle 1A and the other vehicle 1B is becoming longer (Step S9/NO), it determines the sound volume of the sound image so that the sound volume is smaller than at the previous time of determination (Step S11).

Then, the control section 110 determines the direction of localization of the sound image on the basis of the relative speed of the other vehicle 1B with respect to the own vehicle 1A (Step 12). If the relative speed of the other vehicle 1B with respect to the own vehicle 1A is a positive value (Step S12/YES), the control section 110 changes the localized position of the call voice toward the direction of moving away from the own vehicle 1A (Step S13). If the relative speed of the other vehicle 1B with respect to the own vehicle 1A is a negative value (Step S12/NO), the control section 110 changes the localized position of the call voice toward the direction of moving close to the own vehicle 1A (Step S14).

Then, the control section 110 controls the DSP 105 and signal amplifying section 160 so that the sound volume becomes as determined at Step S10 or Step S11 and the localized position becomes as determined at Step S13 or Step S14 (Step S15).

Then, the control section 110 determines whether or not the call with the other calling party with which the communication session is established is ended (Step S16). If the call with the other calling party is not ended (Step S16/NO), the control section 110 goes to Step S2. If the call with the other calling party is ended (Step S16/YES), the control section 110 ends this processing flow.

As explained above, the own vehicle 1A according to this embodiment is the own vehicle 1A which includes the wireless communication section 101, application control section 131, and speaker array 170. The application control section 131 makes a voice call by wireless communication and the speaker array 170 has a plurality of speakers 171 to 178 to output voice based on the voice signal of a voice call.

The own vehicle 1A receives the position information of the other calling party in the voice call through the wireless communication section 101 and calculates the relative speed as the moving speed of the other vehicle 1B with respect to the own vehicle 1A on the basis of the received position information.

Furthermore, the own vehicle 1A performs sound image localization processing on the basis of the calculated relative speed so that the sound image of the voice based on the voice signal to be output by the speaker array 170 is in the direction in which the other calling party is positioned after the elapse of the prescribed time.

Therefore, the direction in which the other calling party is positioned after the elapse of the prescribed time can be indicated by the sound image of the voice output by the speaker array. Consequently, the user-friendliness for the rider of the vehicle can be improved by the sound image of the voice based on the voice signal.

Furthermore, as sound image localization processing, the own vehicle 1A changes the sound volume of the voice output from the speaker array 170 according to the distance to the other calling party.

Therefore, the rider of the own vehicle 1A can perceive the distance to the other calling party by the sound volume of the voice output by the speaker array 170.

Furthermore, as sound image localization processing, the own vehicle 1A changes the sound volume of the voice output from the speaker array 170 according to the distance between the own vehicle 1A and the other calling party after the elapse of the prescribed time.

Therefore, the rider of the own vehicle 1A can perceive the distance to the other calling party after the elapse of the prescribed time, by the sound volume of the voice output by the speaker array 170.

Furthermore, if the relative speed becomes large, the own vehicle 1A changes the localized position of the sound image of the voice toward the direction of moving away from the own vehicle 1A.

Therefore, the rider of the own vehicle 1A can perceive that the distance to the other calling party is becoming longer.

Furthermore, if the relative speed becomes small, the own vehicle 1A changes the localized position of the sound image of the voice toward the direction of moving close to the own vehicle 1A.

Therefore, the rider of the own vehicle 1A can perceive that the distance to the other calling party is becoming shorter.

Furthermore, the own vehicle 1A includes the manipulation portion 40 and voice input section 140. When the manipulation portion 40 receives manipulation, the own vehicle 1A sends the voice signal based on the voice received by the voice input section 140 to the other calling party. As the manipulation portion 40 receives the manipulation, the own vehicle 1A causes the speaker array 170 to output a preset notification sound and performs sound image localization processing so that the sound image of the notification sound is in the direction in which the other calling party is positioned after the elapse of the prescribed time.

Therefore, the direction in which the other calling party is positioned can be indicated by the sound image of the notification sound which is output when the manipulation portion 40 receives manipulation. Consequently, the user-friendliness for the rider of the own vehicle 1A can be improved by the sound image of the notification sound.

Furthermore, the position information which the wireless communication section 101 receives is the position information calculated on the basis of a positioning signal received from a positioning satellite.

Therefore, high precision position information can be obtained.

The above embodiment is a preferred embodiment of the present invention. However, the gist of the present invention is not limited to the above embodiment, but can be embodied in various other forms.

REFERENCE SIGNS LIST

1A . . . Vehicle
1B . . . The other vehicle
10 . . . Body frame
11 . . . Power unit
12 . . . Front fork
13 . . . Front wheel
14 . . . Steering handlebar
15 . . . Swing arm
16 . . . Rear wheel
17 . . . Seat
18 . . . Body cover
20 . . . Front screen
21 . . . Meter panel
25 . . . Measuring instrument
26 . . . Measuring instrument
40 . . . Manipulation portion
41 . . . Handlebar manipulation portion
42 . . . Handlebar manipulation portion
43 . . . Center manipulation portion
45 . . . Call start button
51 . . . Rider seat
53 . . . Pillion passenger seat
55 . . . Left mirror
57 . . . Right mirror
71 . . . Vehicle speed sensor
100 . . . Controller
101 . . . Wireless communication section
102 . . . Vehicle information input section
103 . . . Position detection section
105 . . . DSP
110 . . . Control section
120 . . . Storage
121 . . . Control program
130 . . . Processor
131 . . . Application control section
133 . . . Voice sound localization processing section
140 . . . Voice input section
145 . . . Controller board
150 . . . Voice output section
160 . . . Signal amplifying section
170 . . . Speaker array
171 . . . First speaker
172 . . . Second speaker
173 . . . Third speaker 174 . . . Fourth speaker
175 . . . Fifth speaker
176 . . . Sixth speaker
177 . . . Seventh speaker
178 . . . Eighth speaker
161 . . . First AMP
162 . . . Second AMP
163 . . . Third AMP
164 . . . Fourth AMP
165 . . . Fifth AMP
166 . . . Sixth AMP
167 . . . Seventh AMP
168 . . . Eighth AMP

The invention claimed is:

1. A vehicle comprising:

a wireless communication section;

a voice calling section which makes a voice call by wireless communication; and a speaker array which includes a plurality of speakers to output voice based on a voice signal in the voice call, wherein position information of another calling party in the voice call is received by the wireless communication section, and a relative speed as moving speed of the other calling party with respect to the vehicle is calculated on the basis of the received position information, and wherein on the basis of the calculated relative speed, sound image localization processing is performed to make a sound image of the voice to be in a direction in which the other calling party is positioned after elapse of a prescribed time, the sound image of the voice being based on the voice signal to be output by the speaker array.

2. The vehicle according to claim 1, wherein as the sound image localization processing, the vehicle changes a sound volume of the voice output from the speaker array according to a distance to the other calling party.

3. The vehicle according to claim 1, wherein as the sound image localization processing, the vehicle changes a sound volume of the voice output from the speaker array according to a distance between the other calling party and the vehicle after the elapse of the prescribed time.

4. The vehicle according to claim 1, wherein if the relative speed becomes large, the vehicle changes a localized position of the sound image of the voice toward a direction of moving away from the vehicle.

5. The vehicle according to claim 1, wherein if the relative speed becomes small, the vehicle changes a localized position of the sound image of the voice toward a direction of moving close to the vehicle.

6. The vehicle according to claim 1, wherein the vehicle comprises a manipulation portion and a voice input section, wherein when the manipulation portion receives manipulation, the voice signal based on the voice received by the voice input section is sent to the other calling party, wherein as the manipulation portion receives the manipulation, the speaker array is made to output a preset notification sound, and wherein sound image localization processing is performed to make the sound image of the notification sound be in a direction in which the other calling party is positioned after the elapse of the prescribed time.

7. The vehicle according to claim 1, wherein the position information which the wireless communication section receives is position information calculated on the basis of a positioning signal received from a positioning satellite.

* * * * *